United States Patent
Plaisted et al.

(10) Patent No.: US 8,234,821 B2
(45) Date of Patent: Aug. 7, 2012

(54) STRUT RUNNER MEMBER AND ASSEMBLY USING SAME FOR MOUNTING ARRAYS ON ROOFTOPS AND OTHER STRUCTURES

(75) Inventors: Joshua Reed Plaisted, Oakland, CA (US); Brian West, San Rafael, CA (US)

(73) Assignee: PVT Solar, Inc., Fremont, CA (US)

( * ) Notice: Subject to any disclaimer, the term of this patent is extended or adjusted under 35 U.S.C. 154(b) by 0 days.

(21) Appl. No.: 12/761,325

(22) Filed: Apr. 15, 2010

(65) Prior Publication Data

US 2011/0005152 A1    Jan. 13, 2011

Related U.S. Application Data

(63) Continuation of application No. 11/851,299, filed on Sep. 6, 2007, now Pat. No. 7,721,492.

(60) Provisional application No. 60/824,744, filed on Sep. 6, 2006.

(51) Int. Cl.
*E04D 1/36* (2006.01)
*E04D 3/38* (2006.01)
*E04D 13/18* (2006.01)
*E04H 14/00* (2006.01)
*E04C 2/38* (2006.01)

(52) U.S. Cl. ............ 52/58; 52/633; 52/656.1; 52/656.2; 52/656.5; 52/656.9; 52/173.2; 52/173.3

(58) Field of Classification Search .................... 52/633, 52/656.1, 656.2, 656.5, 656.9, 173.2, 173.3, 52/58; 136/206, 230, 244, 251
See application file for complete search history.

(56) References Cited

U.S. PATENT DOCUMENTS

| | | | |
|---|---|---|---|
| 1,159,372 | A | 10/1915 | Goff |
| 1,306,434 | A | 6/1919 | Melanson |
| 2,747,166 | A | 5/1956 | Hoffarth |
| 3,881,799 | A | 5/1975 | Elliott et al. |
| 4,029,080 | A | 6/1977 | Warren |
| 4,061,413 | A | 12/1977 | Keller |
| 4,150,660 | A | 4/1979 | Peters et al. |
| 4,239,555 | A | 12/1980 | Scharlack et al. |
| 4,336,413 | A | 6/1982 | Tourneux |
| 4,372,292 | A | 2/1983 | Ort |
| 4,636,577 | A | 1/1987 | Peterpaul |
| 4,936,063 | A | 6/1990 | Humphrey |

(Continued)

FOREIGN PATENT DOCUMENTS

DE    19804685 A1    8/1999

(Continued)

OTHER PUBLICATIONS

Communication Pursuant to Article 94(3) EPC in Application No. 06733720.4-1266, European Patent Office, Jul. 16, 2008, 6 pages.

(Continued)

*Primary Examiner* — Mark Wendell
(74) *Attorney, Agent, or Firm* — Mahamedi Paradice Kreisman LLP

(57) ABSTRACT

A strut runner includes a member extending lengthwise in a first direction, where the member includes an underlying panel and one or more walls that extend from the panel. The member may be configured to at least partially support the panel array while being integrated or directly connected to the underlying structure. Additionally, the strut runner may include one or more peripheral extensions that extend a distance outward from the body.

10 Claims, 5 Drawing Sheets

U.S. PATENT DOCUMENTS

| | | | |
|---|---|---|---|
| 4,961,712 | A | 10/1990 | Schwenk et al. |
| 4,993,959 | A | 2/1991 | Randollph |
| 5,180,442 | A | 1/1993 | Elias |
| 5,338,369 | A | 8/1994 | Rawlings |
| 5,409,549 | A | 4/1995 | Mori |
| 5,451,167 | A | 9/1995 | Zielinski et al. |
| 5,497,587 | A | 3/1996 | Hirai et al. |
| 5,524,401 | A | 6/1996 | Ishikawa et al. |
| 5,571,338 | A | 11/1996 | Kadonome et al. |
| 5,603,187 | A | 2/1997 | Merrin et al. |
| 5,687,453 | A | 11/1997 | Megregian et al. |
| 5,740,996 | A | 4/1998 | Genschorek |
| 5,788,204 | A | 8/1998 | Goodwin et al. |
| 5,986,203 | A | 11/1999 | Hanoka et al. |
| 6,106,310 | A | 8/2000 | Davis et al. |
| 6,195,066 | B1 | 2/2001 | Pegues et al. |
| 6,201,179 | B1 | 3/2001 | Dalacu |
| 6,269,596 | B1 | 8/2001 | Ohtsuka et al. |
| 6,283,770 | B1 | 9/2001 | Leung et al. |
| 6,320,120 | B1 | 11/2001 | Van Haaster |
| 6,323,478 | B1 | 11/2001 | Fujisaki et al. |
| 6,366,304 | B1 | 4/2002 | Nakayasu et al. |
| 6,465,724 | B1 | 10/2002 | Garvison et al. |
| 6,521,821 | B2 | 2/2003 | Makita et al. |
| 6,959,517 | B2 * | 11/2005 | Poddany et al. ............ 52/173.3 |
| 7,012,188 | B2 | 3/2006 | Erling |
| 7,293,748 | B1 | 11/2007 | Hoser |
| 7,419,377 | B1 | 9/2008 | Briere et al. |
| 7,469,508 | B2 | 12/2008 | Ceria |
| 7,591,920 | B1 | 9/2009 | Fan et al. |
| 7,721,492 | B2 | 5/2010 | Plaisted et al. |
| 7,774,998 | B2 * | 8/2010 | Aschenbrenner ............ 52/173.3 |
| 2003/0010372 | A1 | 1/2003 | Dinwoodie |
| 2003/0015637 | A1 | 1/2003 | Liebendorfer |
| 2003/0070368 | A1 * | 4/2003 | Shingleton .................. 52/173.3 |
| 2003/0071177 | A1 | 4/2003 | Aussiker |
| 2003/0094193 | A1 | 5/2003 | Mapes et al. |
| 2003/0201009 | A1 | 10/2003 | Nakajima et al. |
| 2004/0011354 | A1 | 1/2004 | Erling |
| 2004/0163338 | A1 | 8/2004 | Liebendorfer |
| 2004/0187909 | A1 | 9/2004 | Sato et al. |
| 2004/0221886 | A1 * | 11/2004 | Oono ............................ 136/251 |
| 2005/0161074 | A1 | 7/2005 | Garvison et al. |
| 2006/0032527 | A1 | 2/2006 | Stevens et al. |
| 2006/0042682 | A1 | 3/2006 | Wolfe et al. |
| 2006/0086382 | A1 | 4/2006 | Plaisted |
| 2006/0118163 | A1 | 6/2006 | Plaisted |
| 2006/0124167 | A1 | 6/2006 | Fan et al. |
| 2006/0196128 | A1 * | 9/2006 | Duke ........................... 52/173.3 |
| 2006/0225780 | A1 * | 10/2006 | Johnson et al. ............... 136/244 |
| 2007/0251567 | A1 * | 11/2007 | Plaisted ....................... 136/244 |
| 2007/0295391 | A1 | 12/2007 | Lenox et al. |
| 2008/0053009 | A1 | 3/2008 | Plaisted |
| 2008/0053517 | A1 | 3/2008 | Plaisted |
| 2008/0121273 | A1 | 5/2008 | Palisted |
| 2008/0169018 | A1 * | 7/2008 | Miyamoto et al. ............ 136/251 |
| 2009/0019796 | A1 | 1/2009 | Liebendorfer |
| 2009/0038668 | A1 | 2/2009 | Plaisted |
| 2009/0056792 | A1 * | 3/2009 | Salyer ........................ 136/251 |
| 2009/0165843 | A1 * | 7/2009 | Horioka et al. .............. 136/251 |
| 2010/0018571 | A1 * | 1/2010 | Placer ........................ 136/251 |
| 2010/0147362 | A1 * | 6/2010 | King et al. .................. 136/251 |

FOREIGN PATENT DOCUMENTS

| | | | |
|---|---|---|---|
| EP | 0417303 | A1 | 3/1991 |
| EP | 0587348 | A2 | 3/1994 |
| EP | 0599497 | A1 | 6/1994 |
| EP | 0614058 | A2 | 9/1994 |
| EP | 0905795 | A2 | 3/1999 |
| EP | 1873743 | A2 | 1/2007 |
| JP | 09-184209 | A | 7/1997 |
| JP | 10-159201 | A | 6/1998 |
| JP | 11-186586 | A | 7/1999 |
| JP | 11-204819 | A | 7/1999 |
| JP | 2000-100490 | A | 4/2000 |
| JP | 2001-214579 | A | 8/2001 |
| JP | 2001-262800 | A | 9/2001 |
| JP | 2004-251037 | A | 9/2004 |
| JP | 2005-194771 | A | 7/2005 |
| JP | 2007-262764 | A | 10/2007 |
| WO | WO 02/41407 | A1 | 5/2002 |

OTHER PUBLICATIONS

Communication Pursuant to Article 94(3) EPC in Application No. 06733720.4-1266, European Patent Office, May 25, 2010.

Final Office Action dated Jun. 10, 2009 in U.S. Appl. No. 11/851,299, 10 pages.

Final Office Action dated Oct. 6, 2008 in U.S. Appl. No. 10/855,254, 21 pgs.

Final Office Action dated Dec. 4, 2009 in U.S. Appl. No. 10/855,254, 18 pgs.

Final Office Action dated Dec. 7, 2009 in U.S. Appl. No. 11/332,000, 11 pgs.

International Preliminary Report on Patentability in International Application PCT/US2006/001593, World Intellectual Property Organization, Jul. 26, 2007, 11 pages.

International Preliminary Report on Patentability in International Application PCT/US2007/075531, World Intellectual Property Organization, Oct. 15, 2009, 8 pages.

International Search Report and Written Opinion of the International Searching Authority in International Application PCT/US2006/001593, World Intellectual Property Organization, Oct. 27, 2006, 19 pages.

International Search Report and Written Opinion of the International Searching Authority in International Application PCT/US2007/69304, World Intellectual Property Organization, Mar. 4, 2008, 12 pages.

International Search Report and Written Opinion of the International Searching Authority in International Application PCT/US2007/77433, World Intellectual Property Organization, Mar. 26, 2006, 10 pages.

International Search Report and Written Opinion of Sep. 30, 2009 10 pages.

Non-Final Office Action dated Jan. 13, 2010 in U.S. Appl. No. 11/,947,658 pgs.

Non-Final Office Action dated Mar. 15, 2010 in U.S. Appl. No. 11/750,948; 9 pgs.

Non-Final Office Action dated Jan. 24, 2008 in U.S. Appl. No. 10/855,254, 16 pgs.

Non-Final Office Action dated Aug. 2, 2010 in U.S. Appl. No. 10/855,254; 28 pgs.

Non-Final Office Action dated Nov. 13, 2008 in U.S. Appl. No. 11/851,299, 9 pgs.

Non-Final Office Action dated Jun. 22, 2009 in U.S. Appl. No. 11/332,000, 13 pages.

Non-Final Office Action Dated Jun. 1, 2009 in U.S. Appl. No. 10/855,254, 17 pgs.

Non-Final Office Action dated Jul. 12, 2010 in U.S. Appl. No. 11/848,766.

Notice of Allowance mailed Jan. 11, 2010 in U.S. Appl. No. 11/851,299; 8 pgs.

Notice of Allowance dated May 6, 2010 in U.S. Appl. No. 11/332,000.

Notice of Allowance dated Jul. 12, 2010 in U.S. Appl. No. 11/947,658.

Telestrut Telescoping Strut; Unistrut; http://web.archive.org/web/20030202040614/http://www.unistrut.com/, Jan. 22, 2008.

Unistrut Telespar Telescoping Tubing; Unistrut; http://web.archive.org/web/20030202040614/http://www.unistrut.com/, Jan. 22, 2008.

Final Office Action dated Jul. 20, 2011 in U.S. Appl. No. 11/836,140.

Non-Final Office Action dated Sep. 9, 2011 in U.S. Appl. No. 12/947,601.

Non-Final Office Action dated Jul. 22, 2011 in U.S. Appl. No. 13/042,266.

* cited by examiner

STRUT RUNNER MEMBER AND ASSEMBLY USING SAME FOR MOUNTING ARRAYS ON ROOFTOPS AND OTHER STRUCTURES

RELATED APPLICATIONS

This application is a Continuation of U.S. patent application Ser. No. 11/851,299, filed Sep. 6, 2007, and entitled STRUT RUNNER MEMBER AND ASSEMBLY USING SAME FOR MOUNTING ARRAYS ON ROOFTOPS AND OTHER STRUCTURES, which claims benefit of priority to Provisional U.S. Patent Application No. 60/824,744, filed Sep. 6, 2006, and entitled METHODS OF INSTALLING MOUNTING CHANNELS ON BUILDING FACADES; the aforementioned priority applications are hereby incorporated by reference.

TECHNICAL FIELD

The disclosed embodiments relate generally to the field of solar modules and mounting systems.

BACKGROUND

A popular and existing method of mounting equipment such as solar panels to a roof is by the use of posts called stanchions. These stanchions are usually fastened to structural members (e.g. rafters or trusses) located just below the top roof surface called the decking. Before the stanchions are fastened to the structural members, the difficult task of locating the exact position of these members must be undertaken. The method for finding the structural members varies from using a proximity sensor (e.g. commercially available stud finder), to taking an educated guess and drilling or hammering a nail into the structural member, to very carefully measuring inside and outside of the structure. After the structural member has been located, a pilot hole must be drilled through the decking and into the structural member. The stanchion can then be fastened to the roof by means of a lag screw. Afterward, to prevent water from penetrating into the structure, the stanchion must be flashed into the roofing with a conical-shaped sheet metal part, such as a flashing boot. Roof sealant, like mastic, may be applied between the stanchion and the roof surface and between the flashing and the stanchion to further ensure weatherproofing.

The entire process of locating the structural member, drilling a pilot hole, fastening the stanchion, sealing, and flashing is time-consuming and labor-intensive. To add to the cost of the labor required, the cost to purchase and stock the stanchions, associated hardware, sealant, and flashings are also expensive. In addition to stanchion style products such as TILE-TRAC and the FASTJACK series from PROFESSIONAL SOLAR PRODUCTS of Camarillo Calif., commercial hangar bolts and other structural stanchions are employed with similar labor requirements and results.

The use of stanchions is popular because the roof penetrations for the stanchions can be reliably sealed using existing roofing methods with a standard flashing. However, the use of stanchions typically raises the mounted equipment off the roof by 4-8", which is not aesthetically pleasing.

BRIEF DESCRIPTION

DETAILED DESCRIPTION

Figure 1:
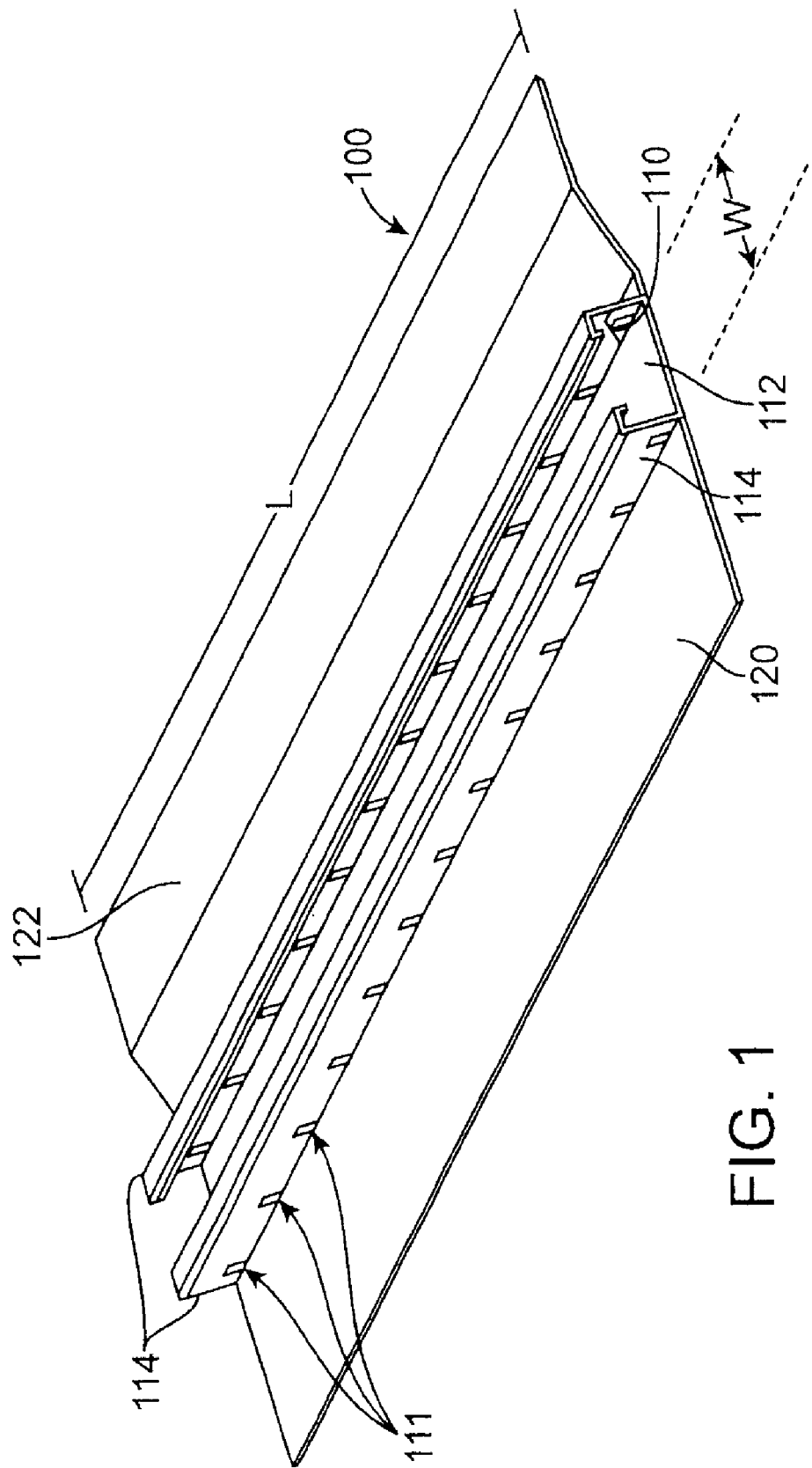
FIG. 1 is an isometric view of a strut runner member, under an embodiment of the invention.

Embodiments described herein provide a strut runner for mounting a panel array to an underlying structure. Examples of equipment include solar module arrays, such as those that provide photovoltaic or thermal output. Under an embodiment, the strut runner includes a member extending lengthwise in a first direction, where the member includes an underlying panel and one or more walls that extend from the panel. The member may be configured to at least partially support the equipment while being integrated or directly connected to the underlying structure. Additionally, the strut runner may include one or more peripheral extensions that extend a distance outward from the member.

Furthermore, an embodiment may utilize a strut runner such as shown or described with embodiments in a mounting assembly for a solar module array. Still further, an embodiment may utilize a strut runner such as shown and described with embodiments in an assembly that is mounted on an underlying structure.

Embodiments described herein provide for a mounting assembly that can be directly mounted onto a rooftop or other structure with surface thickness (e.g. such as roof decking), or even inset into such thicknesses, in a manner that is water proof or resistant. Additionally, embodiments described herein reduce labor, part cost, and reduce the height of mounting structures such as solar panel arrays on a rooftop or other surfaces. Furthermore, embodiments described herein enable a mounted assembly for solar modules and arrays in a manner that is much more aesthetically pleasing and building integrated.

Embodiments further recognize that a mounting assembly such as used for solar modules and array benefit when using the fewest stanchions or members possible, because of the cost of materials and the time required for mounting each stanchion. This results in high point loadings on the stanchions and structural framing those stanchions are lagged into. Embodiments described herein provide a strut runner and mounting assembly using the strut runner that enables reduction in the cost and time required to drill and fasten the individual strut runners (and assembly) to the underlying structure. Under an embodiment such as provided herein, more attachments may be made between an assembly and structural members of the rooftop or underlying structure, with little or no added installation time or cost.

A strut runner is a member that connects equipment such as a solar module array to an underlying structure. Generally, a strut runner has a length that spans a dimension of at least one solar module in the array. Other members or member assemblies that retain the solar modules in position, including rail assemblies that form a Common Compressed Rail (CCR), may interconnect to the underlying structure using the strut runner. Thus, a strut runner generally does not directly interface with a solar module, but embodiments described herein do contemplate unitary constructed combinations that combine the roles of the strut runner with a member of, for example, a CCR system.

While numerous embodiments described herein make specific mention or rooftops, embodiments described herein are applicable to any building facade of surface such as vertical walls, atriums, awnings, and carports. As such, the mounting surfaces should include any external surface where there is a concern for weatherproofing.

Also, while the structural mounting channel has been illustrated as commercially available and known 'strut' material such as that manufactured by UNISTRUT of Wayne, Mich. and B-LINE of Highland, Ill., the mounting channel may take various forms such as slotted rail that accepts T-shaped bolts to commercially available DIN rail or other possible shapes capable of being attached to. As such, the reference to strut and the illustrations of this widely used commercial product should be taken to represent but a single illustrative embodiment of a mounting channel. Several other configurations as outlined above are also possible and therefore the reference to strut material should not limit the scope of the invention to a single style of mounting channel.

FIG. 1 is an isometric view of a strut runner member, under an embodiment of the invention. A strut runner member 100 (alternatively referred to as 'strut runner') includes a member 110 having a length L and width W. While a strut runner is specifically mentioned, any kind of mounting channel can be used with features such as described, and whether directly or indirectly supporting a larger assembly such as provided with an embodiment of FIG. 2. The member 110 includes an underlying panel 112 that is positioned to abut and connect to an underlying structure (not shown in FIG. 1). A pair of sidewalls 114 extend from panel 112. As described elsewhere, the sidewalls 114 include openings 111 or apertures which enable water or other fluid to drain from an interior (as defined by sidewalls 114 and panel 112) of the member 110.

In an embodiment, the strut runner includes laterally extending (i.e. in direction of width W of member 110) panels or extensions, in the form of flanges 120, 122. In one embodiment, the flanges 120, 122 are flat or include a smooth surface. The flanges 120, 122 can be integrated or combined with the underlying structure (not shown in FIG. 1). In one embodiment, the flanges 120, 122 provide a flashing that enables water flow directed towards member 110 to be passed over the member. In this regard, strut runner 100 may be mounted onto an underlying structure that is at an incline. The first flange 120 may be provided upstream (first to encounter water flow) and the second flange 122 may be provided downstream. Both flanges 120, 122 may extend underneath a thickness of the structure to provide the flashing effect. Thus, in an embodiment in which the underlying structure is a rooftop (such as on a home or dwelling), the flanges 120, 122 extend under the decking of the rooftop.

As an alternative or addition, flanges 120, 122 provide support for maintaining the strut runner 100 attached, particularly in the presence of wind or other forces. More specifically, flanges 120, 122 can extend under decking or other thickness of the underlying structure to resist lift forces from wind or other forces that may act on a mounted assembly by partially coupling the load to the decking.

Figure 2:
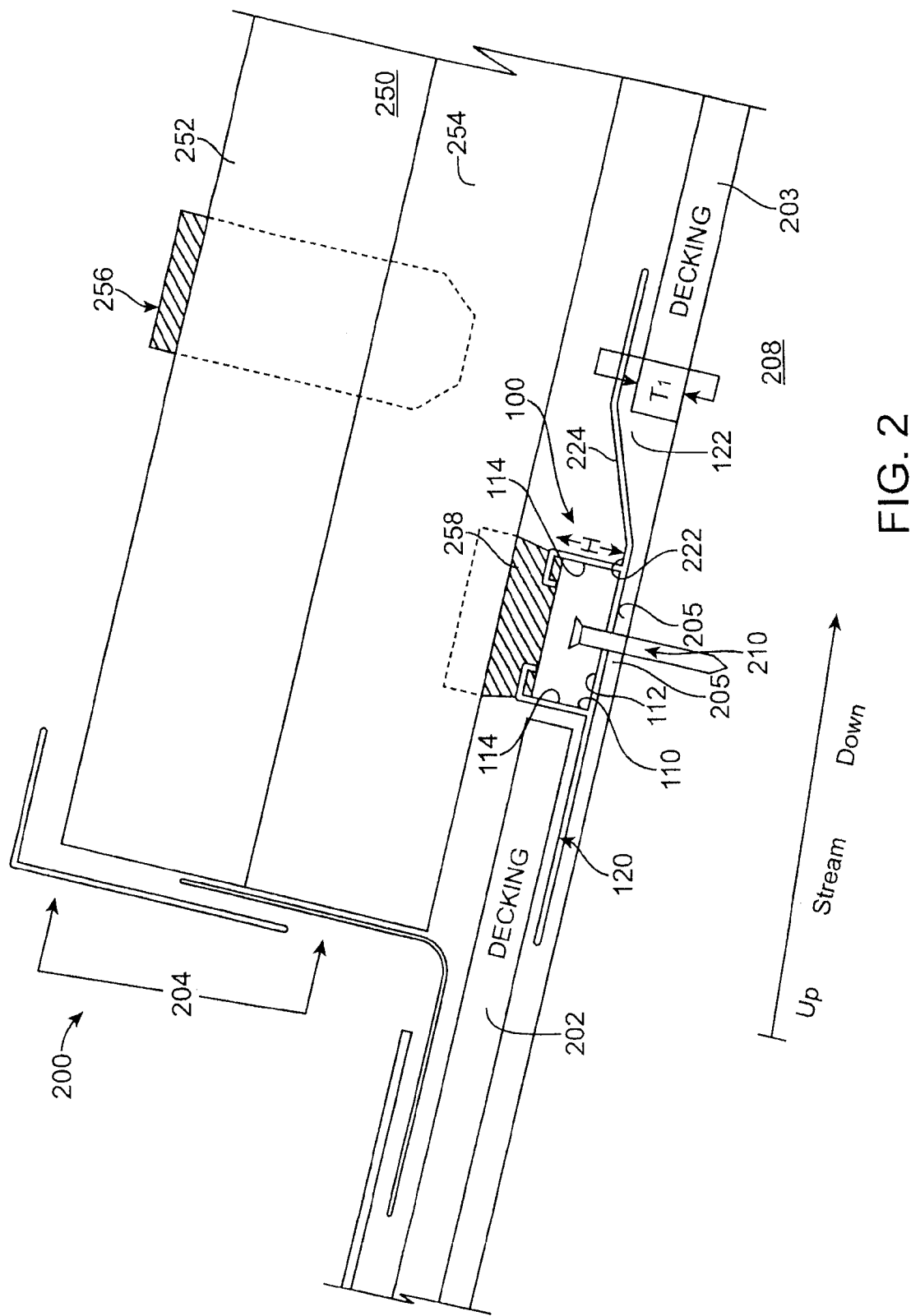
FIG. 2 is a side cross-sectional view of strut runner member 100 as provided for in a mounted environment, under an embodiment of the invention.

FIG. 2 is a side cross-sectional view of strut runner member 100 as provided for in a mounted environment, under an embodiment of the invention. In an embodiment, the strut runner member 100 is implemented as part of a mounting assembly 200 for mounting a solar module array (not shown in FIG. 2) to an underlying structure at an incline. The solar module array may include multiple solar modules containing, for example, photovoltaic solar modules and/or solar thermal modules. The mounting assembly 200 may have various forms. In one implementation, the common compressed rail (CCR) structure 250 is used, in which case assembly 200 includes a first rail 252 and second rail 254 that combine to grasp and retain a solar panel. A compression mechanism 256 (e.g. a bolt) may compress the first and second rails 252, 254 together when assembly occurs, to hold and affix the solar panel(s) in place. The mounting assembly 200 may attach to the strut member 100 via an interconnect mechanism 258, such as through a separate bolt and strut nut component (not shown).

The following applications provide various details on different forms of CCR rail structures and mounting assemblies that may be used with embodiments described herein. All of the following applications are hereby incorporated by reference in their respective entirety: U.S. patent application Ser. No. 11/332,000, filed Jan. 13, 2006, entitled RACK ASSEMBLY FOR MOUNTING SOLAR MODULES; Provisional U.S. Patent Application No. 60/643,619, filed Jan. 13, 2005, entitled PV/THERMAL INTEGRATED ENERGY SUPPLY SYSTEM; U.S. patent application Ser. No. 10/855,254, filed May 26, 2004, entitled MECHANISM FOR MOUNTING SOLAR MODULES; and Provisional U.S. Patent Application No. 60/544,753, filed Feb. 13, 2004, entitled SYSTEM, METHOD, AND APPARATUS FOR MOUNTING A SOLAR MODULE.

The strut runner member 100 may use fasteners, such as an insertion fastener 210 (e.g. bolt, large screw) to secure to the underlying structure 208. The underlying structure 208 may correspond to a rooftop of a dwelling, for example. As such, the structure 208 may include thicknesses, such as in the form of decking 202 (upstream) and 203 (downstream), having a thickness T1. In one embodiment, the strut runner 100 sits on a surface 205 that is exposed by leaving some of the decking 202 (or other thickness) absent from the underlying structure. The fastener 210 may penetrate the underlying surface 205.

As described with an embodiment of FIG. 1, the strut runner 100 includes the panel 112 of the member 110 that affixes or attaches to the surface 205 of the structure 208. The sidewalls 114, 114 may extend a height H from panel 112. The first flange 120 is positioned upstream with respect to the potential water flow, and as such may be extended underneath decking 202. The second flange 122 is positioned downstream so as to receive water flow passing over or through member 110 of the strut runner 100. The second flange 122 may include a trough area 222, and a slant extension 224 that passes over the downstream decking 203. Thus, the flanges 120, 122 may be different in design, with one flange suited to receive water passing over the decking 202 and the other flange being shaped to pass water onto decking 203. This structure enables the flanges 120, 122 in combination to provide flashing for the strut runner 100.

As illustrated by an embodiment of FIG. 2, apertures 111 may be positioned at a height on each of the sidewalls 114, 114 to either receive water from the decking 202 or to pass water onto decking 203.

With regard to the assembly 200 as a whole, other flashing elements may also be provided to limit the amount of rainfall or water impinging on the strut runner. For example, exterior component 204 may provide a flash and counter flash element. Such a component is described in U.S. patent application Ser. No. 11/750,948 and Provisional U.S. Patent Application No. 60/74,593; both of which are hereby incorporated by reference in their entirety.

Figure 3:
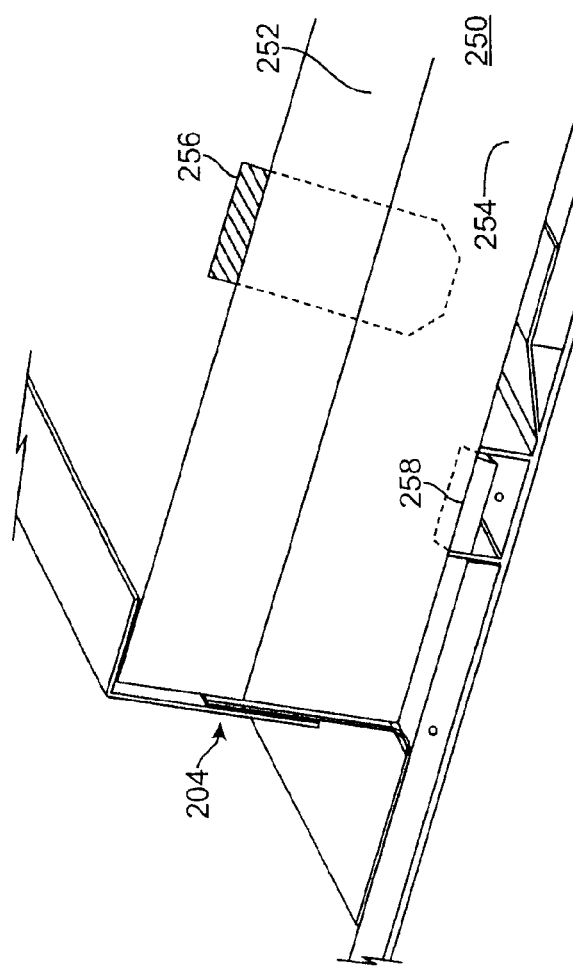
FIG. 3 is a front isometric view of assembly 200, as shown and described with an embodiment of FIG. 2.

FIG. 3 is a front isometric view of assembly 200, as shown and described with an embodiment of FIG. 2. As shown, the strut runner 100 reduces an overall height of the assembly 200, including of the CCR assembly 250. on the underlying structure 200. This is accomplished in part by lowering strut runner 100 into (or below) an exterior thickness (i.e. decking 202, 204) of the underlying structure 200. The strut runner 100 may, for example, be directly attached to structural members of a roof.

Figure 4:
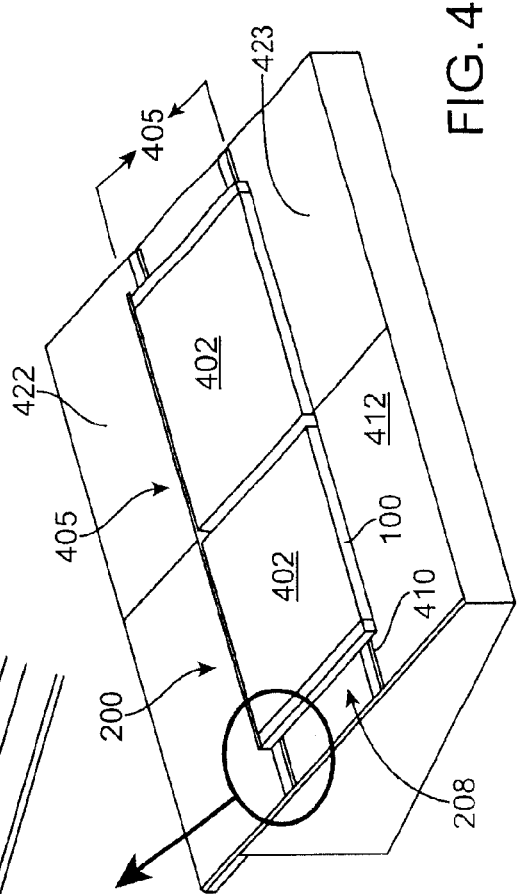
FIG. 4 illustrates a mounting assembly for supporting one or more solar modules at an incline, under an embodiment of the invention.

FIG. 4 illustrates the assembly 200 mounted on the underlying structure 208 at an incline, under an embodiment. As show, multiple strut runners 100 may be used to support an array 405 providing multiple solar panels/modules (modules being structure that retains panels) in position to receive sunlight. In an embodiment, strut runners 100 may be secured to the structure members 410 of the roof 412 to support the array and the mounting assembly that retains the array.

For installation, an embodiment provides that a lower roof decking 423 is installed first, and then the strut runner member 100 is installed with its lower or downstream flange 122 on top of the lower roof decking. Then, the upper roof decking 422 is installed on top of the upper flange 120 of the strut runner 100. This order of installation creates an shingle style overlap with flashing characteristics.

Figure 5:
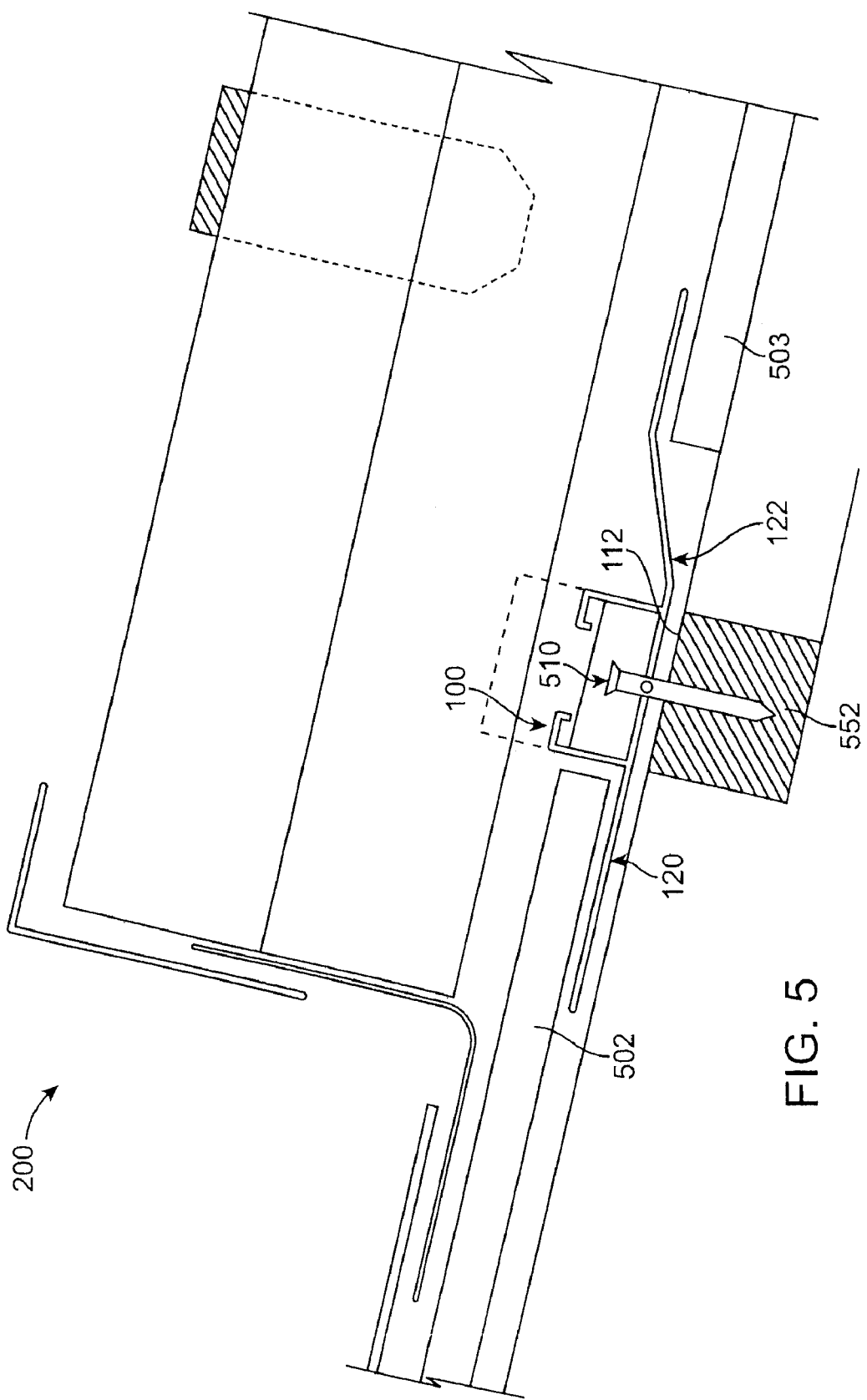
FIG. 5 illustrates a mounting assembly that incorporates a strut runner such as described, according to an embodiment of the invention.

FIG. 5 illustrates mounting assembly 200 in which the strut runner 100 is fastened to one or more structural members 552 below the roof-line (or decking) by driving a fastener 510 through the base of the underlying panel 112 of the member 110. Alternately, fastener 510 may be inserted through the upper flange 120 so that it is covered by the roof decking when it is installed for additional weatherproofing.

In addition to creating a shingle style weatherproofing, an embodiment provides that the flanges 120, 122 add structural strength to the entire assembly 200. This is in large part achieved by transferring loads from the member 110 of strut runner 100 onto the adjacent roof decking 502, 503 along the length of the strut. During uplift (e.g. upwards force on the strut due to wind loads), for example, the flange 120 remains constrained by the upper roof decking 502. Releasing the strut runner 100 would thereby necessitate failure or tear-off of the upper roof decking 502 or shearing the upper flange 120 from the member 110 of the strut runner 100, both of which would necessitate large applied loads. The strut runner 100 is also able to resist downward forces (e.g. snow loads) through a similar interaction of the lower flange 122 with the lower section of roof decking 503.

Figure 6:
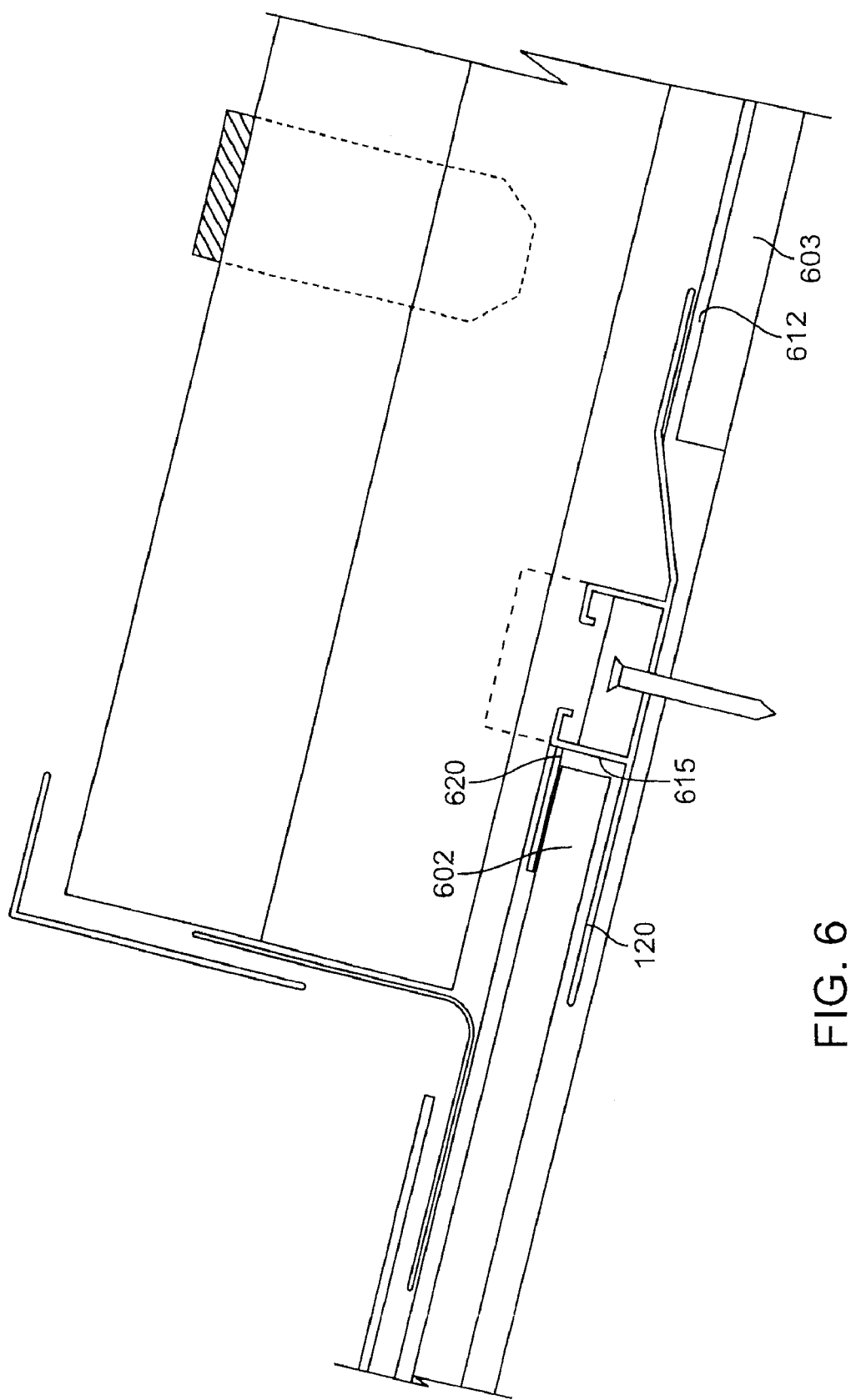
FIG. 6 illustrates a variation of how a strut runner may be configured to function integrally with an underlayment, under an embodiment of the invention.

FIG. 6 illustrates a variation of how strut runner 100 may be configured to function integrally with an underlayment, under an embodiment of the invention. The underlayment 612 may correspond to, for example, a metal skin that provides additional weatherproofing. In this configuration, the lower portion of underlayment 612 is applied to the lower portion of the roof deck 603 before the strut runner 100 is placed thereon, such that the lower flange 122 diverts or guides any water directly on top of the underlayment 612 in a shingle like manner for weatherproofing. The underlayment integration detail on the top of the custom strut runner 100 may be achieved by adding a secondary upper extension 620, near, for example, an upper surface of the strut runner 100. This creates a cavity 615 in the space between the upper flange 120 and the secondary upper extension 620 to receive a thickness of the roof deck 602. With the roof deck secured within cavity 615, a section of underlayment 612 may be applied over the roof deck and on top of the secondary upper extension 620. Therefore, any water running down the roof would be on top of the underlayment 612 and be diverted directly onto the strut runner 100 without the potential to damage to the roof deck. The underlayment 612 may be secured or fastened to the secondary upper extension 620 with, for example, fasteners (e.g. rivets or screws), or with adhesives (e.g. silicone, mastic, custom adhesives) for a non-penetrating attachment.

As an alternative or addition to an embodiment such as described with FIG. 6, one or more strut runners 100 in a mounted assembly may be surface mounted to the underlying structure and then flashed with an underlayment or other thickness. For example, the strut runner 100 may be interleaved with the underlayment using a flashing detail, while being positioned on the surface of the underlying structure.

ALTERNATIVES

As another alternative, while embodiments described herein are specific to solar modules, the embodiments may be equally applicable to any mounting structure for retaining any kind of assembly on an underlying structure, particularly at an incline.

Although the descriptions above contain many specifics, these should not be construed as limiting the scope of the invention but as merely providing illustrations of some embodiments.

What is claimed is:

1. A strut runner for mounting a module array to an underlying structure on an incline, the strut runner comprising:
    a member extending lengthwise in a first direction, the member including a panel and two or more sidewalls that extend from the panel, the member being configured to at least partially support a solar panel array while being integrated or directly connected to the underlying structure, and wherein the two or more sidewalls each include a plurality of apertures; and
    a first peripheral extension that extends outward from the member so as to extend upward on the incline;
    a second peripheral extension that extends outward from the member so as to extend downward on the incline;
    wherein the first peripheral extension is configured to extend underneath a surface of the underlying structure to facilitate transition of the water flow from the underlying structure through the plurality of apertures of each of the two or more sidewalls and onto the second peripheral extension.

2. The strut runner of claim 1, wherein the one or more peripheral extensions include flashing structures that integrate to the underlying structure.

3. The strut runner of claim 1, wherein the first peripheral extension includes a first flange, and wherein the second peripheral extension includes a second flange, and wherein the first flange extends under a first surface of the underlying structure that is upstream from the member, and the second flange extends over a second surface of the underlying structure that is downstream from the member.

4. The strut runner of claim 1, wherein each of the one or more sidewalls includes a plurality of apertures, the plurality of apertures being positioned to receive water from a water flow when the member is mounted onto the underlying structure.

5. The strut runner of claim 4, wherein the plurality of apertures are positioned to receive water from the water flow when the member is surface mounted onto the underlying structure.

6. The strut runner of claim 4, wherein the plurality of apertures are positioned to receive water from the water flow when the member is sunken in the underlying structure.

7. A strut runner for mounting a module array to an underlying structure, the strut runner comprising:

a member extending lengthwise in a first direction, the member including a panel and one or more sidewalls that extend from the panel, each sidewall having a plurality of apertures, the member being configured to at least partially support a solar panel array; and a first flashing structure that integrates the member with the underlying structure, the first flashing structure being shaped relative to the member to enable water to pass over the first flashing structure and through the plurality of apertures of each of the one or more sidewalls.

8. The strut runner of claim 7, wherein the first flashing structure extends upward on an incline of the underlying structure.

9. The strut runner of claim 7, wherein the member is surface mounted onto the underlying structure.

10. The strut runner of claim 7, wherein the member is sunken in the underlying structure.

* * * * *